(12) United States Patent
Kumazawa

(10) Patent No.: US 11,667,276 B2
(45) Date of Patent: Jun. 6, 2023

(54) VEHICLE

(71) Applicant: TOYOTA JIDOSHA KABUSHIKI KAISHA, Toyota (JP)

(72) Inventor: Suguru Kumazawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 17/120,241

(22) Filed: Dec. 13, 2020

(65) Prior Publication Data

US 2021/0179090 A1 Jun. 17, 2021

(30) Foreign Application Priority Data

Dec. 13, 2019 (JP) .............................. JP2019-225352

(51) Int. Cl.
*B60W 30/06* (2006.01)
*B60W 40/105* (2012.01)

(52) U.S. Cl.
CPC .......... *B60W 30/06* (2013.01); *B60W 40/105* (2013.01); *B60W 2520/30* (2013.01); *B60W 2540/10* (2013.01)

(58) Field of Classification Search
CPC ............... B60W 30/06; B60W 40/105; B60W 2520/30; B60W 2540/10; B60W 30/18109; B62D 15/0285
See application file for complete search history.

(56) References Cited

U.S. PATENT DOCUMENTS

| | | | | |
|---|---|---|---|---|
| 4,819,163 A * | 4/1989 | Shimizu | ................ | B60W 10/06 477/109 |
| 7,016,803 B2 * | 3/2006 | Kitazawa | ............. | B60K 31/047 701/93 |
| 9,387,861 B1 * | 7/2016 | Lurie | .................... | B60W 50/10 |
| 2006/0061464 A1 * | 3/2006 | Okada | ................ | B60G 17/0165 340/459 |
| 2006/0175103 A1 * | 8/2006 | Iida | ........................ | B60W 20/10 180/65.235 |
| 2007/0255478 A1 * | 11/2007 | Wakashiro | ............ | B60W 10/06 701/96 |
| 2008/0105479 A1 | 5/2008 | Nishiike et al. | | |

(Continued)

FOREIGN PATENT DOCUMENTS

JP        H-0688541 A  *   3/1994
JP        2008111430 A     5/2008

(Continued)

OTHER PUBLICATIONS

JPH-0688541-A Translation (Year: 1994).*
Driver's Evaluations of the Active Accelerator Pedal in a Real-Life Trial (Year: 2006).*

*Primary Examiner* — Jeff A Burke
*Assistant Examiner* — Kyle T Johnson
(74) *Attorney, Agent, or Firm* — Hunton Andrews Kurth LLP

(57) ABSTRACT

The ECU executes TRC for controlling the posture of the vehicle and automatic parking control for parking the vehicle at a target parking position without being based on the vehicle operation of the user. The ECU calculates a user accelerator opening based on the operation amount of the accelerator pedal and a control accelerator opening calculated in reverse from the required driving force of the vehicle.

3 Claims, 6 Drawing Sheets

(56) References Cited

U.S. PATENT DOCUMENTS

| | | | | |
|---|---|---|---|---|
| 2010/0076661 A1* | 3/2010 | Ueoka | .................... | B60T 8/175 |
| | | | | 701/84 |
| 2010/0286858 A1* | 11/2010 | Otokawa | ................ | B60K 6/365 |
| | | | | 180/65.21 |
| 2011/0057814 A1* | 3/2011 | Park | .................... | B60W 10/18 |
| | | | | 340/932.2 |
| 2012/0022755 A1* | 1/2012 | Oda | ...................... | B60W 10/11 |
| | | | | 701/58 |
| 2016/0001774 A1* | 1/2016 | Nakada | ................ | B60W 30/06 |
| | | | | 701/41 |
| 2016/0096431 A1* | 4/2016 | Drews | .................. | B60K 31/02 |
| | | | | 701/96 |
| 2018/0126982 A1 | 5/2018 | Okamura et al. | | |

FOREIGN PATENT DOCUMENTS

| | | | |
|---|---|---|---|
| JP | 2008174048 A | 7/2008 | |
| JP | 2010167804 A | 8/2010 | |
| JP | 2013126868 A | 6/2013 | |
| JP | 2018075904 A | 5/2018 | |

\* cited by examiner

VEHICLE

This nonprovisional application is based on Japanese Patent Application No. 2019-225352 filed on Dec. 13, 2019 with the Japan Patent Office, the entire contents of which are hereby incorporated by reference.

BACKGROUND

Field

The present disclosure relates to a vehicle, and more particularly, to a vehicle capable of executing vehicle posture control for controlling the posture of the vehicle and automatic parking control for automatically parking the vehicle at a target parking position.

Description of the Background Art

Japanese Patent Laying-Open No. 2018-75904 discloses a vehicle that performs a parking assistance operation for automatically parking a vehicle from a current position to a target parking position. In this vehicle, during the parking assist operation, the driving force of the vehicle is limited such that the driving force actually outputted is smaller than the required driving force of the vehicle determined based on the operation of the accelerator pedal by the passenger. Thus, unintended movement (e.g., jumping out) of the passenger is suppressed (see Japanese Patent Laying-Open No. 2018-75904).

SUMMARY

There is known a vehicle that performs vehicle posture control for stabilizing the posture of the vehicle when the behavior of the vehicle becomes unstable. In the vehicle posture control, for example, when slipping of the driving wheel is detected when a user (driver) depresses an accelerator pedal, control (traction control) is performed to recover grip force of the driving wheel by braking the driving wheel or suppressing driving force.

In the vehicle capable of executing the vehicle posture control and the automatic parking control for performing the parking assist operation as described above, when the driving force of the vehicle during the automatic parking control is automatically controlled without being based on the operation of the accelerator pedal, the driving force is controlled without being based on the operation of the accelerator pedal during the automatic parking control, and thus the vehicle posture control is not activated.

An object of the present disclosure is to provide a vehicle capable of performing vehicle posture control even during automatic parking control.

A vehicle of the present disclosure includes an accelerator pedal that is operable by a user, and a controller. The controller executes vehicle posture control for controlling posture of the vehicle, and automatic parking control for parking the vehicle at a target parking position without being based on operation of the vehicle by the user. The controller calculates a first control accelerator pedal position (user accelerator pedal position) based on an operation amount of the accelerator pedal, and a second control accelerator pedal position calculated inversely from a driving force of the vehicle, and executes the vehicle posture control based on the second control accelerator pedal position during execution of the automatic parking control.

For this vehicle, during execution of the automatic parking control, the vehicle posture control is executed based on the second control accelerator pedal position that is calculated inversely from the driving force of the vehicle. Therefore, even during execution of the automatic parking control that is performed without being based on operation of the accelerator pedal by the user, the vehicle posture control can be executed.

The controller may calculate a third control accelerator pedal position to be used for calculating a driving force of the vehicle during non-execution of the automatic parking control. The controller may cause, after completion of the automatic parking control, the third control accelerator pedal position to gradually approach the first control accelerator pedal position (user accelerator pedal position) from zero.

With such a configuration, if the accelerator pedal has been depressed at the time of completion of the automatic parking control, it is possible to suppress sudden output of the driving force based on the first control accelerator pedal position (user accelerator pedal position) upon completion of the automatic parking control.

The controller may determine, during non-execution of the automatic parking control, whether to execute the vehicle posture control based on the first control accelerator pedal position (user accelerator pedal position). The controller may determine, during execution of the automatic parking control, whether to execute the vehicle posture control based on the second control accelerator pedal position.

With such a configuration, even during execution of the automatic parking control that is performed without being based on operation of the accelerator pedal by the user, the vehicle posture control can be performed based on the second control accelerator pedal position.

The vehicle posture control may include traction control for suppressing idle rotation of a driving wheel of the vehicle.

For this vehicle, even during execution of the automatic parting control that is performed without being based on operation of the accelerator pedal by the user, the traction control can be performed.

During execution of the automatic parking control, the controller may calculate a target speed of the vehicle. The controller may calculate a driving force of the vehicle that causes the vehicle to reach the target speed, without being based on the first control accelerator pedal position (user accelerator pedal position).

With such a configuration, the automatic parking control can be executed without operating the accelerator pedal.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
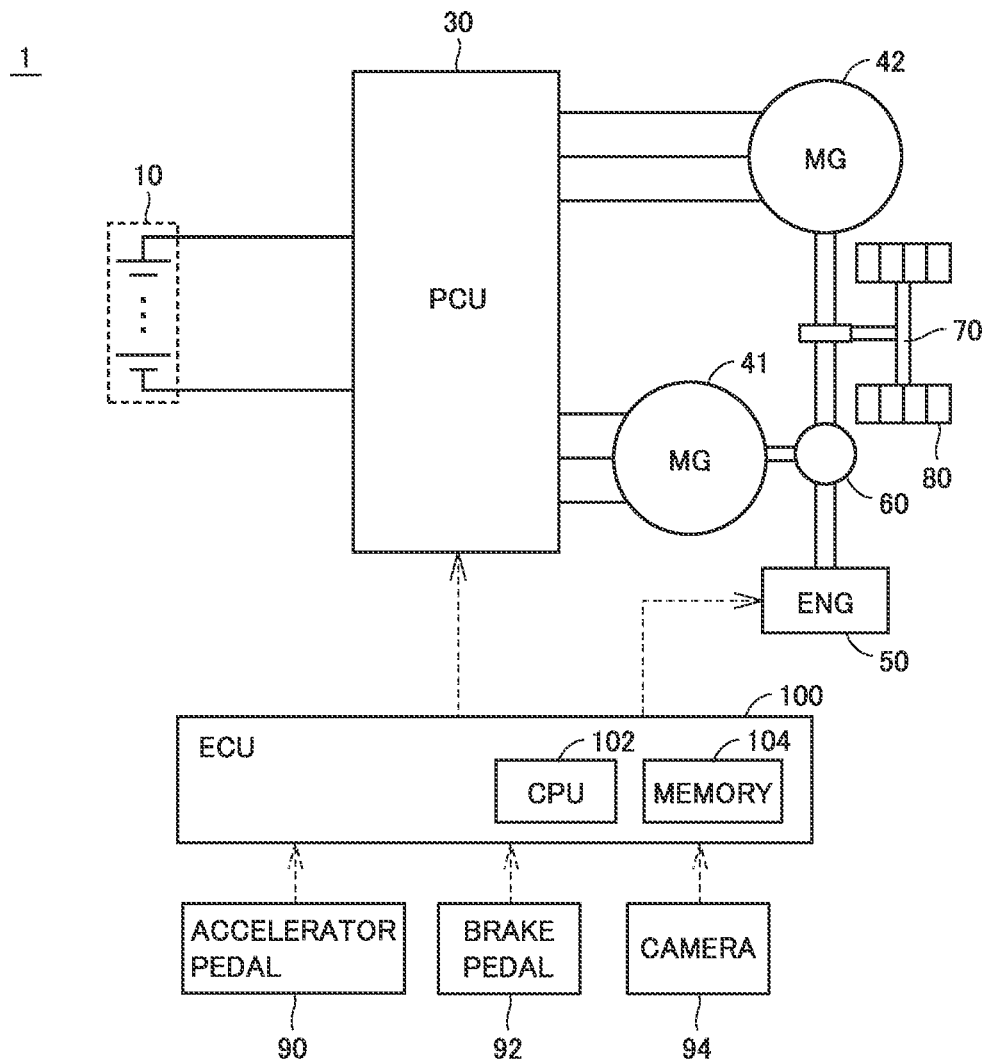
FIG. 1 is a diagram schematically showing a configuration of a vehicle according to an embodiment of the present disclosure.

Hereinafter, embodiments of the present disclosure will be described in detail with reference to the drawings. In the drawings, the same or corresponding portions are denoted by the same reference numerals, and the description thereof will not be repeated.

FIG. 1 is a diagram schematically showing a configuration of a vehicle according to an embodiment of the present disclosure. In the following description, the vehicle is a hybrid vehicle equipped with an engine and an electric motor for driving, but the vehicle according to the present disclosure may be a vehicle equipped with only the engine as a driving source, an electric vehicle not equipped with the engine as a driving source, or the like.

Referring to FIG. 1, a vehicle 1 includes a power storage device 10, a power control unit (hereinafter, it will be referred to as a "PCU (Power Control Unit)") 30, motor generators (hereinafter, this is referred to as "MG (Motor Generator)") 41 and 42, an engine 50, a power split device 60, a drive shaft 70, and drive wheels 80. The vehicle 1 further includes an accelerator pedal 90, a brake pedal 92, a camera 94, and an electronic control unit (hereinafter, it is referred to as "ECU (Electronic Control Unit)") 100.

The power storage device 10 is a rechargeable power storage element. The power storage device 10 includes, for example, a secondary battery such as a lithium ion battery or a nickel-hydrogen battery, and/or a power storage element such as an electric double layer capacitor. The lithium ion secondary battery is a secondary battery using lithium as a charge carrier, and may include a so-called all-solid battery using a solid electrolyte as well as a general lithium ion secondary battery in which an electrolyte is liquid.

The power storage device 10 stores electric power for driving the MGs 41 and 42, and can supply electric power to the MGs 41 and 42 through the PCU 30. When the MGs 41 and 42 generate electric power, the power storage device 10 receives the generated electric power through the PCU 30 and is charged.

The PCU 30 performs bidirectional power conversion between the power storage device 10 and the MGs 41 and 42 in accordance with a control signal from the ECU 100. The PCU 30 is configured such that the states of the MGs 41 and 42 can be separately controlled, and, for example, the MG 42 can be brought into a power running state while the MG 41 is brought into a regenerative (power generation) state. The PCU 30 includes, for example, two inverters provided corresponding to the MGs 41 and 42, and a converter for boosting a DC voltage supplied to each inverter to a voltage equal to or higher than the voltage of the power storage device 10.

The MGs 41 and 42 are AC rotating electric machines, and are, for example, three-phase AC synchronous motors in which permanent magnets are embedded in a rotor. The MG 41 is mainly used as a generator driven by the engine 50 via the power split device 60. The electric power generated by the MG 41 is supplied to the MG 42 or the power storage device 10 via the PCU 30.

The MG 42 operates mainly as an electric motor and drives the drive wheels 80. The MG 42 is driven by receiving at least one of electric power from the power storage device 10 and electric power generated by the MG 41, and the driving force of the MG 42 is transmitted to the drive shaft 70. On the other hand, during braking of the vehicle, the MG 42 operates as a generator to perform regenerative power generation. The electric power generated by the MG 42 is supplied to the power storage device 10 via the PCU 30.

The engine 50 is an internal combustion engine that outputs power by converting combustion energy generated when a mixture of air and fuel is burned into kinetic energy of a moving element such as a piston or a rotor. The power split device 60 includes, for example, a planetary gear mechanism having three rotation shafts of a sun gear, a carrier, and a ring gear. The power split device 60 splits the power output from the engine 50 into power for driving the MG 41 and power for driving the drive wheels 80.

The accelerator pedal 90 is operated by a user (driver) to adjust the driving force of the vehicle 1, The brake pedal 92 is operated by a user (driver) to adjust the braking force of the vehicle 1. The camera 94 is an imaging device for capturing an image of the periphery of the vehicle 1, and operates, for example, when automatic parking control (described later) is executed.

The ECU 100 includes CPU (Central Processing Unit) 102, a memory (ROM (Read Only Memory) and RAM (Random Access Memory)) 104, and input/output ports (not shown) for inputting and outputting various signals. The ECU 100 controls the engine 50 and the PCU 30 based on signals received from the sensors, programs and maps stored in the memory 104, and the like, thereby executing various controls such as a traveling state of the vehicle and charging and discharging of the power storage device 10. Note that these controls are not limited to processing by software, but may be configured and processed by dedicated hardware (electronic circuit).

As main control executed by the ECU 100, the ECU 100 calculates a required driving force for the vehicle 1 to travel, and executes driving force control for controlling the driving force of the vehicle 1 in accordance with the calculated required driving force.

Further, the ECU 100 executes automatic parking control for automatically parking the vehicle 1 at a target parking position based on the image information acquired by the camera 94. In the vehicle 1 according to the present embodiment, the ECU 100 executes various controls (steering control, driving force control, brake control, etc.) for parking the vehicle 1 at a target position without being based on the vehicle operation (steering operation, accelerator pedal operation, etc.) of the user.

Further, the ECU 100 executes vehicle posture control for stabilizing the posture of the vehicle 1 when the behavior of the vehicle 1 becomes unstable. As an example, when the idle rotation (slipping) of the drive wheel 80 is detected when the user depresses the accelerator pedal 90, the ECU 100 executes control (Hereinafter, it is referred to as "TRC (traction control)".) for restoring the grip force of the drive wheel 80 by braking the drive wheel 80 or suppressing the driving force.

Here, as described above, when the TRC system is configured such that the automatic parking control is performed without being based on the operation of the accelerator pedal by the user, and when the slipping of the drive wheel 80 is detected by the depression of the accelerator pedal 90, the TRC is not activated during the automatic parking control. Even during the automatic parking control, there is a possibility that the drive wheel 80 slips and the behavior of the vehicle 1 becomes unstable, for example, when the vehicle goes over the step.

Thus, in the vehicle 1 according to the present embodiment, during execution of the automatic parking control, the ECU 100 performs calculation backward of the accelerator opening degree from the required driving force calculated in the automatic parking control, and performs TRC based on the calculated accelerator opening degree. More specifically, whether or not to execute TRC is determined on the basis of the accelerator pedal position calculated back from the required driving force calculated in the automatic parking control. Thus, even during the automatic parking control, it is possible to prevent the behavior of the vehicle 1 from becoming unstable.

Figure 2:
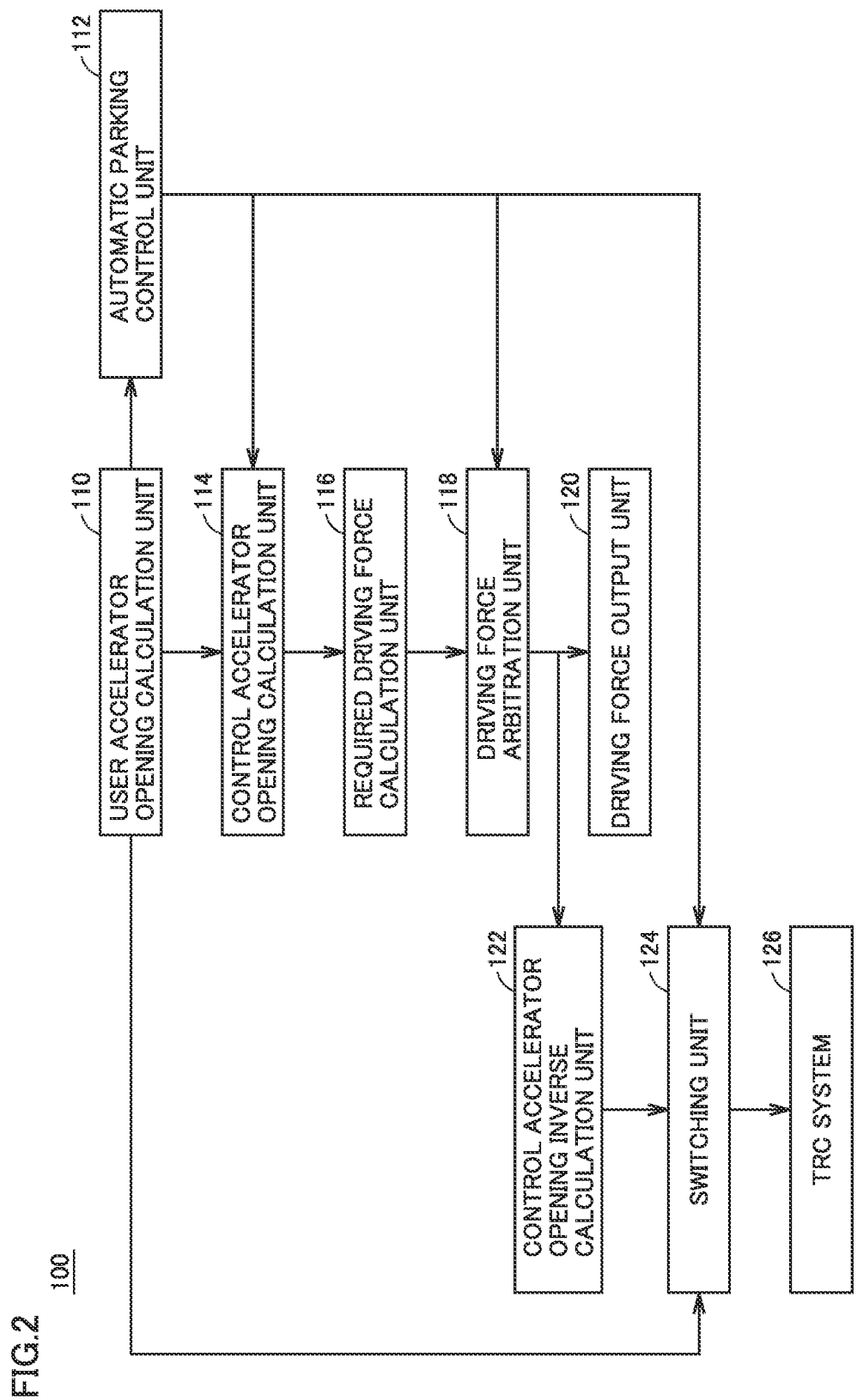
FIG. 2 is a block diagram showing a functional configuration of an ECU.

FIG. 2 is a block diagram showing a functional configuration of the ECU 100 shown in FIG. 1. Referring to FIG. 2, ECU 100 includes a user accelerator opening degree calculation unit 110, an automatic parking control unit 112, a control accelerator opening degree calculation unit 114, a required driving force calculation unit 116, a driving force arbitration unit 118, a driving force output unit 120, a control accelerator opening degree reverse calculating unit 122, a switching unit 124, and a TRC system 126.

The user accelerator opening degree calculation unit 110 detects an operation amount of the accelerator pedal 90 (FIG. 1) by the user, and calculates a control accelerator opening degree (first control accelerator opening degree) based on the operation amount of the accelerator pedal 90. Hereinafter, the control accelerator opening based on the operation amount of the accelerator pedal 90 may be referred to as a "user accelerator opening".

The automatic parking control unit 112 generates a travel path of the vehicle 1 from the current position of the vehicle 1 to a target parking position based on the image information acquired by the camera 94 (FIG. 1). This movement path may be a movement path from the current position to the target parking space (entry into the parking space) or a movement path from the parking space during parking to the target shipping position (departure from parking space). The automatic parking control unit 112 executes various controls (e steering control, driving force control, and brake control) for moving the vehicle 1 along the generated movement path.

The automatic parking control unit 112 outputs an automatic parking control flag indicating whether or not the automatic parking control is being executed to the control accelerator opening degree calculation unit 114, the driving force arbitration unit 118, and the switching unit 124, which will be described later. Further, the automatic parking control unit 112 calculates a required driving force for moving the vehicle 1 at the target vehicle speed along the generated movement path, and outputs the calculated required driving force to the driving force arbitration unit 118.

During execution of the automatic parking control by the automatic parking control unit 112, the driving force is controlled without being based on the operation of the accelerator pedal 90 by the user as described above, but the automatic parking control unit 112 receives the user accelerator opening based on the operation amount of the accelerator pedal 90 from the user accelerator opening degree calculation unit 110. When the user's accelerator pedal 90 is operated by the user and the user's accelerator opening exceeds the threshold value, the automatic parking control unit 112 temporarily stops the automatic parking control, and displays on a display (not shown) for the user to select whether to stop or continue the automatic parking control. When the automatic parking control is requested to be stopped, the automatic parking control unit 112 stops the automatic parking control and turns off the automatic parking control flag.

The control accelerator opening degree calculation unit 114 calculates a control accelerator opening degree (third control accelerator opening degree) used for calculating the required driving force of the vehicle 1 when the automatic parking control is not executed. More specifically, when the automatic parking control flag received from the automatic parking control unit 112 is OFF (when the automatic parking control is not executed), the control accelerator opening degree calculation unit 114 outputs the user accelerator opening degree received from the user accelerator opening degree calculation unit 110 to the required driving force calculation unit 116.

On the other hand, when the automatic parking control flag is ON (during automatic parking control), the control accelerator opening degree calculation unit 114 sets the control accelerator opening output to the required driving force calculation unit 116 to 0. In this case, the driving force is output in accordance with the requested driving force calculated by the automatic parking control unit 112 by arbitration by the driving force arbitration unit 118, which will be described later.

When the automatic parking control is finished, that is, when the automatic parking control flag received from the automatic parking control unit 112 is switched from ON to OFF, the control accelerator opening degree calculation unit 114 gradually changes the control accelerator opening degree output to the required driving force calculation unit 116 from 0 to approach the user accelerator opening degree.

As described above, during the automatic parking control, the requested driving force is calculated by the automatic parking control unit 112 irrespective of the operation of the accelerator pedal, but if the accelerator pedal 90 is depressed by the user at the end of the automatic parking control, the driving force corresponding to the user's accelerator opening degree is outputted simultaneously with the end of the automatic parking control. Such a case is particularly assumed when automatic parking control is executed at the time of unloading from the parking space.

Therefore, in the vehicle 1 according to the present embodiment, as described above, when the automatic parking control is finished, a gradual change function is provided which gradually changes the control accelerator opening degree for calculating the required driving force from 0 and gradually approaches the user accelerator opening degree. If the accelerator pedal 90 is not depressed at the end of the automatic parking control (at the time of entering the parking space or the like), the control accelerator opening degree for calculating the required driving force and the user accelerator opening degree are both 0.

The required driving force calculation unit 116 calculates the required driving force of the vehicle 1 based on the control accelerator opening (third control accelerator opening) received from the control accelerator opening degree calculation unit 114. For example, the required driving force can be calculated from the control accelerator opening degree and the vehicle speed using a map or the like prepared in advance showing the relationship among the accelerator opening degree, the vehicle speed, and the required driving force. The required driving force calculated by the required driving force calculation unit 116 is a required driving force used when the automatic parking control is not executed.

The driving force arbitration unit 118 arbitrates whether the requested driving force calculated by the required driving force calculation unit 116 is used for driving the vehicle 1 or the requested driving force calculated by the automatic parking control unit 112 is used for driving the vehicle 1 based on the automatic parking control flag received from the automatic parking control unit 112. Specifically, when the automatic parking control flag is OFF (when the automatic parking control is not executed), the driving force arbitration unit 118 outputs the requested driving force received from the required driving force calculation unit 116 to the driving force output unit 120, On the other hand, when the automatic parking control flag is ON (during automatic parking control), the driving force arbitration unit 118 outputs the requested driving force received from the automatic parking control unit 112 to the driving force output unit 120.

The driving force output unit 120 executes various controls (control of the engine 50, control of the PCU 30, MG 42, and the like) for the vehicle 1 to output the driving force based on the requested driving force received from the driving force arbitration unit 118.

In order to allow TRC to be performed even during automatic parking control in which the user accelerator opening degree is not reflected in the required driving force of the vehicle 1, the control accelerator opening degree reverse calculating unit 122 calculates backwardly the control accelerator opening degree (second accelerator opening degree) from the required driving force arbitrated by the driving force arbitration unit 118.

It should be noted that the "back-calculation" usually calculates the required driving force from the accelerator opening, and calculates the accelerator opening for realizing the required driving force from the required driving force. For example, the control accelerator opening degree (second accelerator opening degree) can be calculated from the requested driving force and the vehicle speed by using a map or the like indicating the relationship among the accelerator opening degree, the vehicle speed, and the requested driving force, which is used in the required driving force calculation unit 116.

The control accelerator opening calculated by the control accelerator opening degree reverse calculating unit 122 is used during automatic parking control, as will be described later in the switching unit 124. Since the required driving force output from the driving force arbitration unit 118 during the automatic parking control is the required driving force calculated by the automatic parking control unit 112, the control accelerator opening degree reverse calculating unit 122 may directly receive the required driving force from the automatic parking control unit 112 to calculate the control accelerator opening degree (second accelerator opening degree).

Based on the automatic parking control flag received from the automatic parking control unit 112, the switching unit 124 switches whether to use the user accelerator opening degree (first accelerator opening degree) for the TRC system 126 or to use the control accelerator opening degree (second accelerator opening degree) calculated by the control accelerator opening degree reverse calculating unit 122 for the TRC system 126.

Specifically, when the automatic parking control flag is OFF (when the automatic parking control is not executed), the switching unit 124 outputs the user accelerator opening (first accelerator opening) received from the user accelerator opening degree calculation unit 110 to the TRC system 126, On the other hand, when the automatic parking control flag is ON (during automatic parking control), the switching unit 124 outputs the control accelerator opening (second accelerator opening) received from the control accelerator opening degree reverse calculating unit 122 to the TRC system 126.

The TRC system 126 performs TRC based on the accelerator pedal opening received from the switching unit 124. More specifically, the TRC system 126 performs TRC when the idle rotation of the drive wheel 80 is detected when the accelerator opening received from the switching unit 124 is larger than the threshold value.

More specifically, during non-execution of the automatic parking control, since the accelerator opening received from the switching unit 124 is the user accelerator opening, TRC is performed when slipping of the drive wheel 80 is detected when the user accelerator opening is larger than the threshold value. On the other hand, during the automatic parking control, the accelerator pedal opening received from the switching unit 124 is a control accelerator pedal opening back-calculated from the required driving force during the automatic parking control, and when the control accelerator pedal opening is larger than the threshold value, when the slipping of the drive wheel 80 is detected, TRC is performed.

The threshold value is used to activate the TRC because the drive wheel 80 slips due to the accelerator pedal opening, and is appropriately set depending on the degree of accelerator pedal opening to activate the TRC.

The TRC system 126 controls the driving force of the vehicle 1 so as to suppress the torque of the drive wheel 80 when the slipping of the drive wheel 80 is detected when the accelerator opening received from the switching unit 124 is larger than the threshold value. Alternatively, the TRC system 126 may control the brake device to brake the drive wheel 80.

Figure 3:
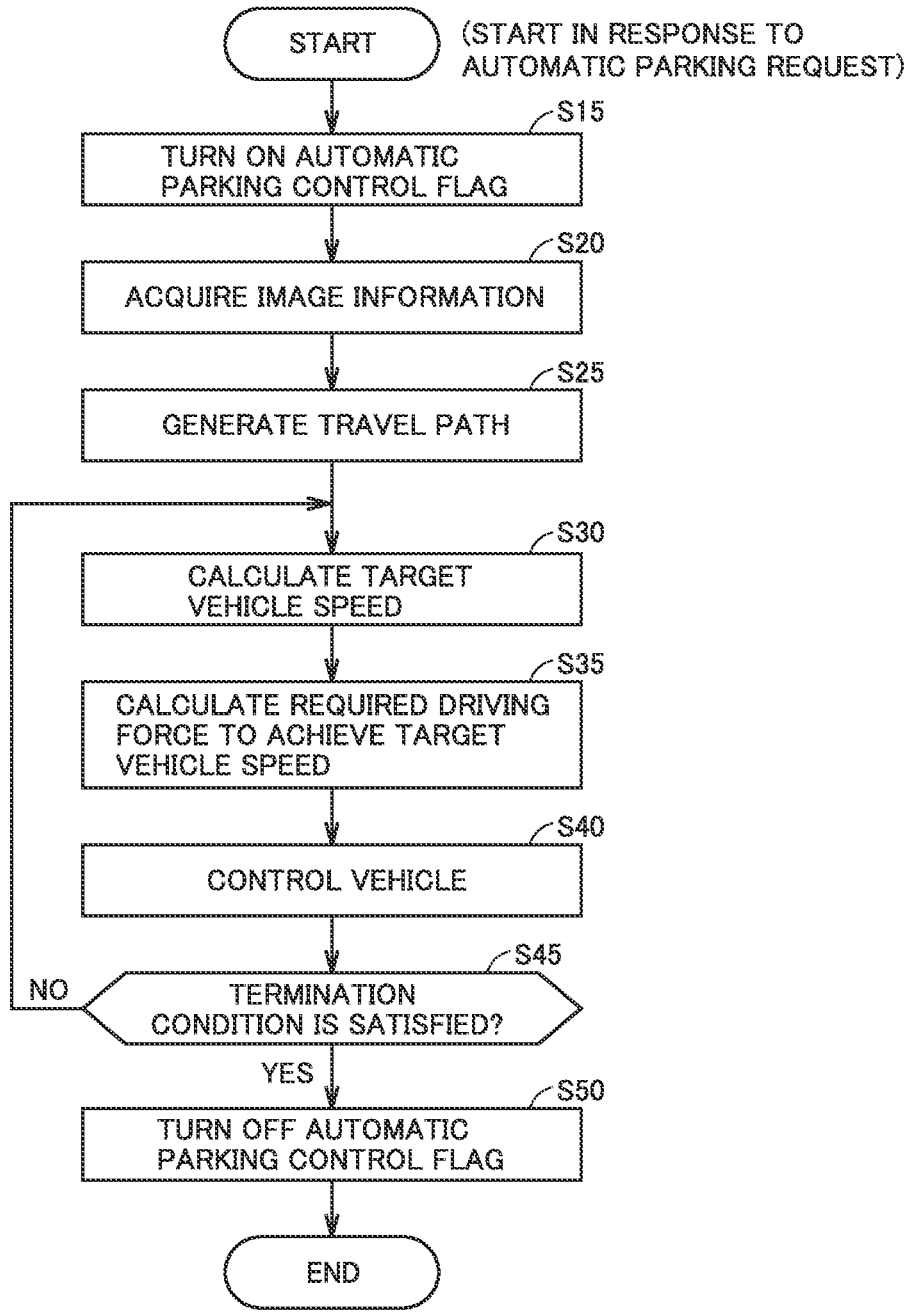
FIG. 3 is a flowchart showing an example of a processing procedure of automatic parking control.

FIG. 3 is a flowchart showing an example of a processing procedure of automatic parking control. A series of processes shown in this flowchart is executed by ECU 100, and is started when automatic parking is requested by the user. The automatic parking request is made, for example, by the user touching an automatic parking start button on a display (not shown).

Referring to FIG. 3, when automatic parking is requested, ECU 100 turns on an automatic parking control flag indicating that automatic parking control is being performed (step S15). Then, the ECU 100 acquires the information of the captured image from the camera 94 that captures the target parking position (step S20).

Next, the ECU 100 generates a travel path of the vehicle 1 from the current position of the vehicle 1 to the target parking position (step S25), Subsequently, the ECU 100 calculates a target vehicle speed when the vehicle 1 is moved along the generated movement path (step S30). Further, ECU 100 calculates the required driving force of vehicle 1 so as to achieve the calculated target vehicle speed (step S35). For example, the required driving force can be calculated by feeding back the deviation between the target vehicle speed and the actual vehicle speed. Then, the ECU 100 controls steering, driving force, brake, and the like of the vehicle 1 so that the vehicle 1 moves at the target vehicle speed along the generated movement path (step S40).

During execution of the automatic parking control, ECU 100 determines whether or not an end condition for terminating the automatic parking control is satisfied (step S45). This termination condition may be satisfied when the vehicle 1 reaches the target parking position. Alternatively, the termination condition may be satisfied when the operation of the accelerator pedal 90 by the user is detected and the automatic parking control is requested to be stopped from the display by the operation of the user.

If it is determined in step S45 that the termination condition is not satisfied (NO in step S45), the process returns to step S30, and the automatic parking control is continued. On the other hand, if it is determined in step S45 that the termination condition is satisfied (YES in step S45), the ECU 100 terminates the automatic parking control and turns off the automatic parking control flag (step S50).

Figure 4:
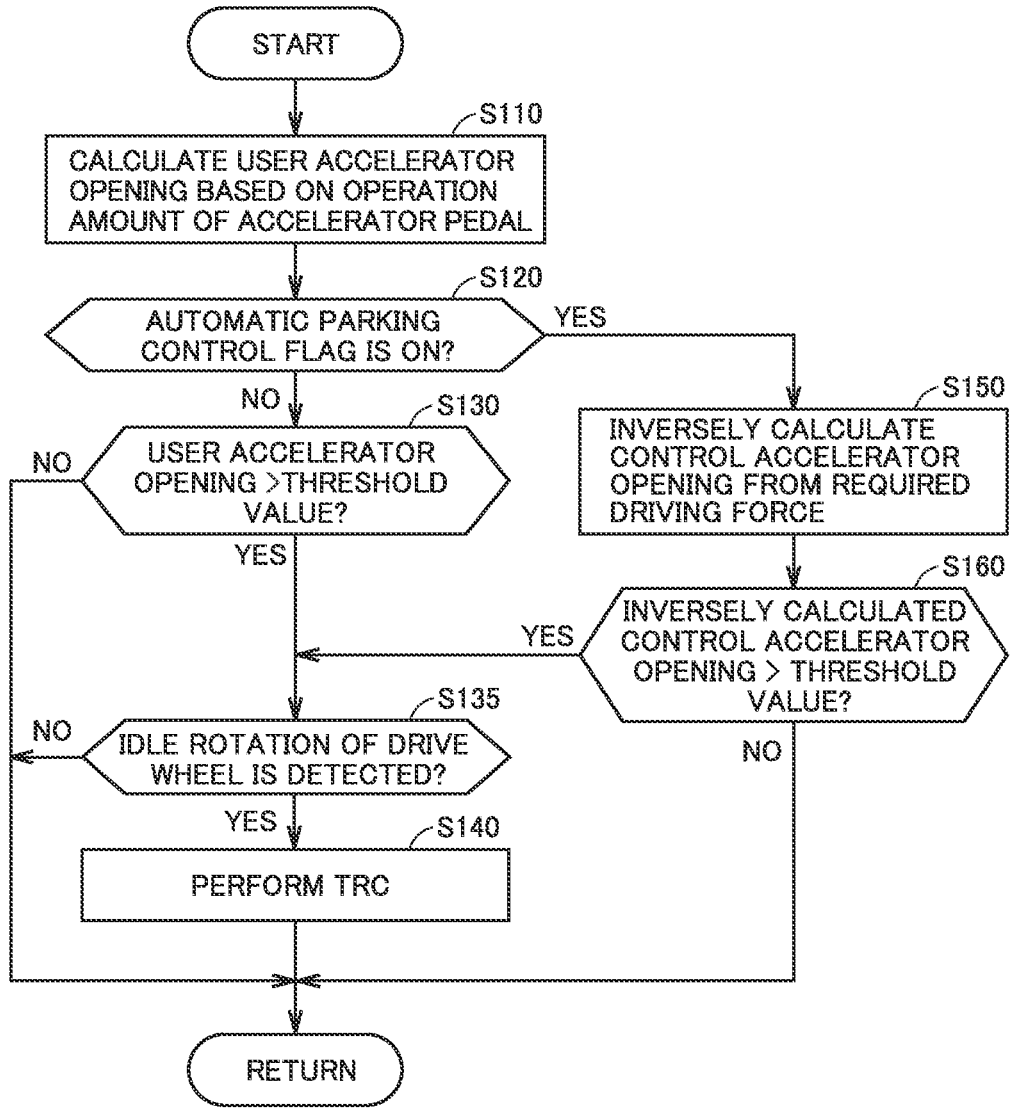
FIG. 4 is a flowchart showing an example of a procedure for determining whether or not TRC is required to be executed.

FIG. 4 is a flowchart showing an example of a procedure for determining whether or not TRC is required to be executed. A series of processes shown in this flowchart is repeatedly executed by the ECU 100 at predetermined intervals.

Referring to FIG. 4, ECU 100 calculates a user accelerator opening (first control accelerator opening) that is a control accelerator opening based on an operation amount of accelerator pedal 90 (FIG. 1) (step S110).

Next, ECU 100 determines whether or not the automatic parking control flag is ON (step S120). When the automatic parking control flag is OFF (NO in step S120), ECU 100 determines whether or not the user accelerator opening based on the accelerator pedal operation amount of the user is greater than a threshold value (step S130).

When it is determined that the user accelerator opening degree is greater than the threshold value (YES in step S130), ECU 100 determines whether or not slipping of drive wheel 80 has been detected (step S135). For example, when the rotational speed of the drive wheel 80 increases rapidly, it is detected that the slipping of the drive wheel 80 has occurred.

When the slipping of the drive wheel 80 is detected (YES in step S135), the ECU 100 performs TRC (step S140). As described above, when the automatic parking control is not executed, the TRC is executed based on the user accelerator opening degree corresponding to the accelerator pedal operation amount of the user.

When the user accelerator opening degree is equal to or less than the threshold value (NO in step S130), or when slipping of the drive wheel 80 is not detected (NO in step S135), the ECU 100 shifts the process to return without executing TRC.

On the other hand, if it is determined in step S120 that the automatic parking control flag is ON (YES in step S120), the ECU 1.00 calculates backwardly the control accelerator opening (second control accelerator opening) from the required driving force calculated in the automatic parking control (the required driving force calculated in step S35 in FIG. 3) (step S150). For example, the control accelerator opening degree (second accelerator opening degree) can be calculated from the required driving force and the vehicle speed by using a map or the like prepared in advance showing the relationship among the accelerator opening degree, the vehicle speed, and the required driving force.

Then, ECU 100 determines whether or not the control accelerator opening degree obtained by back-calculation from the required driving force is greater than a threshold value (step S160). The threshold value may be the same as the threshold value used in step S130.

When it is determined that the control accelerator opening degree is greater than the threshold value (YES in step S160), ECU 100 shifts the process to step S135. When it is determined in step S135 that the slipping of the drive wheel 80 has been detected, the process proceeds to step S140, and TRC is performed. Thus, during the automatic parking control, TRC is performed based on the control accelerator opening calculated from the requested driving force during the automatic parking control, not based on the accelerator pedal operation amount of the user.

When the control accelerator opening calculated in step S150 is equal to or less than the threshold value (NO in step S160), ECU 100 shifts the process to return without shifting the process to step S135.

Figure 5:
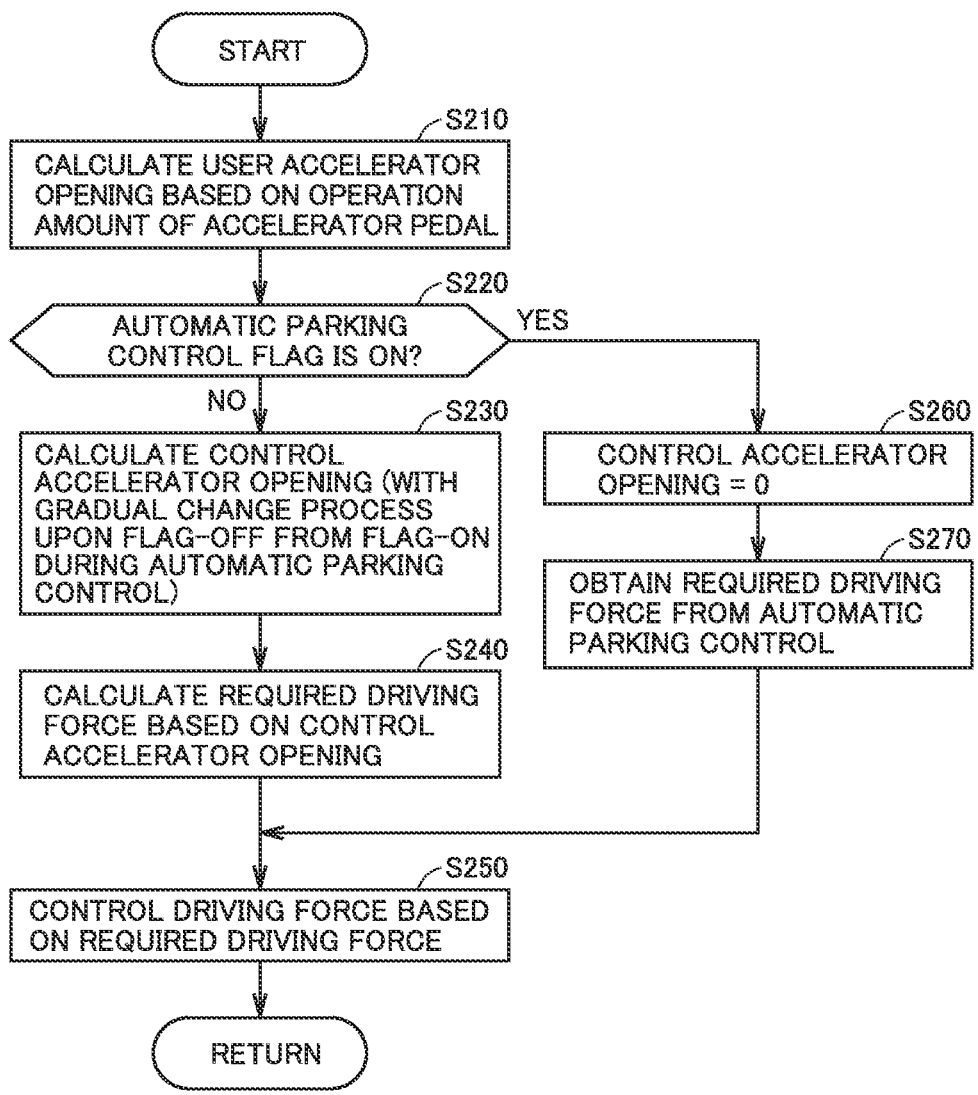
FIG. 5 is a flowchart showing an example of a procedure for calculating a required driving force.

FIG. 5 is a flowchart showing an example of a procedure for calculating a required driving force. A series of processes shown in this flowchart is also repeatedly executed by the ECU 100 at predetermined intervals.

Referring to FIG. 5, ECU 100 calculates a user accelerator opening (first control accelerator opening) based on an operation amount of accelerator pedal 90 (FIG. 1) (step S210). Next, ECU 100 determines whether or not the automatic parking control flag is ON (step S220).

When the automatic parking control flag is OFF (NO in step S220), ECU 100 calculates a control accelerator opening (third control accelerator opening) for calculating the required driving force of vehicle 1 based on the user accelerator opening calculated in step S210 (step S230).

Basically, the control accelerator opening degree for calculating the required driving force is the user accelerator opening degree. However, immediately after the automatic parking control flag is switched from ON to OFF (that is, immediately after the automatic parking control is finished), the control accelerator opening degree is gradually approached while gradually varying from 0 to the user accelerator opening degree, instead of setting the user accelerator opening degree to the control accelerator opening degree for calculating the required driving force as it is.

Figure 6:
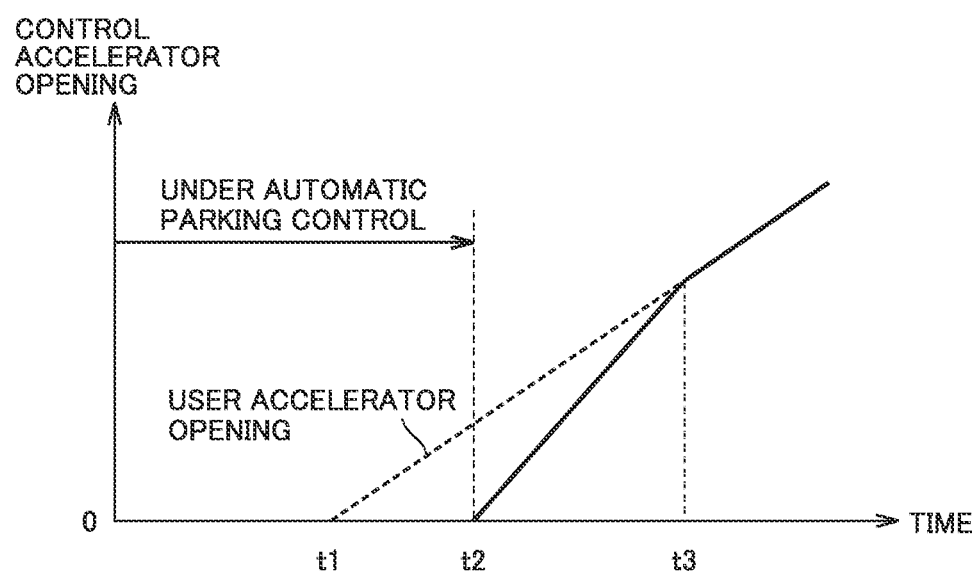
FIG. 6 is a timing chart showing an example of the transition of the control accelerator opening degree before and after the end of the automatic parking control.

FIG. 6 is a timing chart showing an example of the transition of the control accelerator opening degree before and after the end of the automatic parking control. In FIG. 6, a solid line indicates a control accelerator opening degree (third control accelerator opening degree) for calculating a required driving force, and a dotted line indicates a user accelerator opening degree based on an accelerator pedal operation amount of the user.

Referring to FIG. 6, until time t2, automatic parking control is progress (automatic parking control flag ON), and at time t2, automatic parking control is terminated (automatic parking control flag OFF). During the automatic parking control, the required driving force is calculated in the automatic parking control, and the control accelerator opening degree (third control accelerator opening degree) for calculating the required driving force is 0.

On the other hand, the user intends to start early after completion of the automatic parking control at the time of shipping from the parking space or the like. Therefore, the accelerator pedal 90 is operated from time t1 before time t2 at which the automatic parking control is finished, and the user's accelerator opening degree is not zero at time t2 at which the automatic parking control is finished.

In such a case, if the control accelerator opening degree tier calculating the requested driving force is assumed to be the user accelerator opening degree at the same time as the end of the automatic parking control, the driving force corresponding to the user accelerator opening degree is rapidly output at the same time as the end of the automatic parking control, and there is a possibility that the user feels uncomfortable. Therefore, in the vehicle 1 according to the present embodiment, as described above, when the automatic parking control is finished, the control accelerator opening degree for calculating the required driving force is gradually approached while gradually varying from 0 to the user accelerator opening degree. Thus, the driving force is prevented from being suddenly output at the same time as the end of the automatic parking control.

Referring again to FIG. 5, when the control accelerator opening degree (third control accelerator opening degree) for calculating the required driving force is calculated in step S230, ECU 100 calculates the required driving force of vehicle 1 based on the calculated control accelerator opening degree (step S240). Since this process is executed when the automatic parking control flag is OFF, the required driving force calculated here is the required driving force used when the automatic parking control is not executed.

On the other hand, if it is determined in step S220 that the automatic parking control flag is ON (YES in step S220), ECU 100 sets the control accelerator opening degree (third control accelerator opening degree) to 0 (step S260). Then, ECU 100 obtains the required driving force calculated in the automatic parking control (step S270). That is, during the automatic parking control, the control accelerator opening degree (third control accelerator opening degree) for calculating the required driving force calculated based on the accelerator opening degree is set to 0, and the required driving force calculated in the automatic parking control is used.

When the requested driving force is calculated in step S240 or the requested driving force of the automatic parking control is acquired in step S270, ECU 100 controls the driving force of vehicle 1 based on the calculated or acquired requested driving force (step S250).

As described above, according to this embodiment, during execution of the automatic parking control, TRC is executed based on the control accelerator pedal position calculated in reverse from the driving force of the vehicle 1. Therefore, according to this embodiment, the TRC can be executed even during execution of the automatic parking control performed without being based on the operation of the accelerator pedal by the user.

Further, according to this embodiment, when the automatic parking control is finished, the control accelerator opening degree for calculating the required driving force is gradually approached from 0 to the user accelerator opening degree, so that when the accelerator pedal 90 is depressed at the end of the automatic parking control, it is possible to suppress the driving force from being suddenly output in accordance with the user accelerator opening degree at the end of the automatic parking control.

Although the TRC has been described as an example of the vehicle posture control in the above embodiment, the vehicle posture control executed based on the control accelerator opening calculated back from the required driving force during execution of the automatic parking control is not limited to the TRC, and may include control (VSC: Vehicle Stability Control) for suppressing the side slippage of the vehicle 1 by adjusting the driving force of the vehicle 1.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:
an accelerator pedal that is operable by a user; and
a controller that executes vehicle posture control for controlling posture of the vehicle, and automatic parking control for parking the vehicle at a target parking position without being based on operation of the vehicle by the user,
the controller
calculating a first control accelerator pedal position based on an operation amount of the accelerator pedal, and a second control accelerator pedal position calculated backwardly from a driving force of the vehicle,
executing the vehicle posture control based on the second control accelerator pedal position during execution of the automatic parking control,
calculating a third control accelerator pedal position to be used for calculating a driving force of the vehicle during non-execution of the automatic parking control, and
causing, after completion of the automatic parking control, the third control accelerator pedal position to gradually approach the first control accelerator pedal position from zero.

2. The vehicle according to claim 1, wherein the vehicle posture control includes traction control for suppressing idle rotation of a driving wheel of the vehicle.

3. The vehicle according to claim 1, wherein
during execution of the automatic parking control,
the controller
calculates a target speed of the vehicle, and
calculates a driving force of the vehicle that causes the vehicle to reach the target speed, without being based on the first control accelerator pedal position.

* * * * *